US009118269B2

(12) United States Patent
Hiry et al.

(10) Patent No.: US 9,118,269 B2
(45) Date of Patent: Aug. 25, 2015

(54) ELECTRONICALLY COMMUTATED ELECTRIC MOTOR WITH DEFECT SHUTDOWN

(75) Inventors: Pascal Hiry, Vaihingen/Enz (DE); Stephan Urban, Ohmden (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 14/130,775

(22) PCT Filed: Jul. 3, 2012

(86) PCT No.: PCT/EP2012/062886
§ 371 (c)(1),
(2), (4) Date: Jan. 3, 2014

(87) PCT Pub. No.: WO2013/004684
PCT Pub. Date: Jan. 10, 2013

(65) Prior Publication Data
US 2014/0152217 A1 Jun. 5, 2014

(30) Foreign Application Priority Data
Jul. 5, 2011 (DE) .......................... 10 2011 078 672

(51) Int. Cl.
*H02P 6/12* (2006.01)
*B62D 5/04* (2006.01)
*H02P 29/02* (2006.01)

(52) U.S. Cl.
CPC ................ *H02P 6/12* (2013.01); *B62D 5/0484* (2013.01); *B62D 5/0487* (2013.01); *H02P 29/021* (2013.01)

(58) Field of Classification Search
CPC ........................................................ H02P 6/12
USPC ................................ 318/400.21, 400.01, 700
See application file for complete search history.

(56) References Cited

U.S. PATENT DOCUMENTS 6,392,418 B1   5/2002  Mir et al.
6,392,854 B1*  5/2002  O'Gorman ...................... 361/31
7,136,733 B2   11/2006 Liu et al.

FOREIGN PATENT DOCUMENTS

DE    10019707    10/2001
DE    10100159    10/2001
(Continued)

OTHER PUBLICATIONS

International Search Report for Application No. PCT/EP2012/062886 dated Jun. 4, 2013 (English Translation, 3 pages).

*Primary Examiner* — David S Luo
(74) *Attorney, Agent, or Firm* — Michael Best & Friedrich LLP

(57) ABSTRACT

The invention relates to an electronically commutated electric motor. The electric motor has a stator and a rotor, in particular one formed with permanent magnets. The electric motor has a control unit, which is connected on the output side in particular via a power output stage to the stator and is designed to energize the stator so as to produce a rotating magnetic field. The electric motor has a power output stage with semiconductor switches. The power output stage is connected to the stator via at least one controllable switch disconnector. The control unit is designed to detect a defect of a semiconductor switch depending on a braking torque caused by the defect, in particular a change over time in the braking torque, on a rotor of the electric motor, and to activate the switch disconnector so as to disconnect the defective semiconductor switch from the stator.

13 Claims, 2 Drawing Sheets

(56) References Cited

FOREIGN PATENT DOCUMENTS

| | | |
|---|---|---|
| DE | 102007031268 | 1/2009 |
| DE | 102008034326 | 2/2009 |
| DE | 102010001241 | 10/2010 |
| JP | H10304556 | 11/1998 |
| JP | 2009278760 | 11/2009 |
| WO | 03099632 | 12/2003 |
| WO | 2009125683 | 10/2009 |
| WO | 2012160092 | 11/2012 |

\* cited by examiner

ELECTRONICALLY COMMUTATED ELECTRIC MOTOR WITH DEFECT SHUTDOWN

BACKGROUND OF THE INVENTION

The invention relates to an electronically commutated electric motor. The electric motor comprises a stator and a rotor, in particular a permanent magnet rotor. The electric motor comprises a control unit that is connected on the output side in particular by way of a power output stage to the stator and is designed so as to energize the stator in order to generate a rotating magnetic field.

In the case of electric motors known in the prior art, the problem resides in that in the event of a defect of a semiconductor switch a power output stage of the electric motor of the semiconductor switches with the defect becomes low resistance and as a result a stator coil of the stator that is connected to the semiconductor switch is permanently short-circuited. Thus, a short circuit current can flow during which the electric motor operates as a generator. Sparks can be produced as the power output stage, in particular of the defective semiconductor switch, is disconnected from the stator by means of a relay. As the defective semiconductor switch is disconnected from the stator by means of a semiconductor switch, in particular a MOS-FET transistor (MOS-FET=metal oxide semiconductor field effect transistor), the MOS-FET transistor can become damaged.

SUMMARY OF THE INVENTION

It is preferred that the electric motor comprises a power output stage having semiconductor switches. The power output stage is connected to the stator by way of at least one controllable disconnecting switch. The control unit is designed so as, in dependence upon a braking torque that is caused by the defect, to detect a defect of a semiconductor switch, preferably a change-over time of the braking torque on the rotor of the electric motor, and to activate the disconnecting switch so as to disconnect the defective semiconductor switch from the stator. It is possible in an advantageous manner by means of ascertaining the braking torque to identify from amongst the semiconductor switches the defective semiconductor switch of the power output stage that comprises by way of example several semiconductor switches. The semiconductor switch that has been identified in this manner can then be disconnected by means of the associated disconnecting switch from the stator, in particular from a stator coil of the stator.

In a preferred embodiment, the electric motor comprises a rotor position sensor that is connected to the control unit. The rotor position sensor is designed so as to ascertain a rotor position of the rotor and to generate a rotor position signal that represents the rotor position. The control unit is preferably designed so as to energize the stator in dependence upon the rotor position signal.

The control unit is preferably designed so as to ascertain the braking torque in dependence upon the rotor position signal. It is further preferred that the control unit is designed so as, in dependence upon the rotor position signal, to generate a rotational speed signal that represents a rotational speed of the rotor, and to ascertain, in dependence upon a frequency modulation of the rotational speed signal, the braking torque, preferably a change-over time of the braking torque or at least a point in time when the braking torque changes. As a consequence, it is possible in an advantageous manner to omit one sensor that can ascertain a defective semiconductor switch. In an advantageous manner, it is thus possible for ascertaining the defective semiconductor switch of the power output stage to use namely a rotor position sensor of the electric motor that is already provided. The control unit can thus be provided in an advantageous and cost-effective manner with the ability to detect a defect.

In a preferred embodiment, the control unit is connected to the disconnecting switch and is designed so as, in dependence upon a voltage drop that occurs across the disconnecting switch, to ascertain a zero-crossing point of a current that is flowing through the defective semiconductor switch and to activate the disconnecting switch into its disconnected mode in the time region of the zero-crossing point. It is thus possible in an advantageous manner to prevent sparks from forming in the case of a relay. In the case of a semiconductor switch that is embodied as a disconnecting switch, in particular a MOS-FET transistor, damage to the disconnecting switch can thus be avoided.

In a preferred embodiment, the control unit is designed so as, in dependence upon the rotor position signal, to ascertain a zero-crossing point of a phase current, in particular of a phase current that is flowing through the defective semiconductor switch of the power output stage when the electric motor is operating as a generator, and to activate the disconnecting switch into its disconnected mode in the time region of the zero-crossing point. The disconnecting switch, in particular the semiconductor disconnecting switch, can thus in an advantage manner remain constantly functional. If the semiconductor disconnecting switch were to become damaged namely as a result of the phase current during the phase when the electric motor is operating as a generator and consequently said semiconductor disconnecting switch were to become low resistance, then the phase current would continue to flow and further disconnecting means would no longer be available in order to disconnect the power output stage from the stator. The electric motor that can be by way of example an electric motor of a servo steering system would then continue to generate a braking torque whilst the vehicle is being steered by means of the servo steering system, which instead of assisting the steering of the vehicle would on the contrary make the steering more difficult.

In a preferred embodiment, the disconnecting switch is a semiconductor switch, in particular a field effect transistor. The control unit is preferably designed so as, in dependence upon a current flow direction of a current that is flowing through the disconnecting switch, to activate the disconnecting switch into its disconnected mode. The control unit is designed by way of example so as to activate the disconnecting switch into its disconnected mode, preferably without taking into consideration the phase condition of the current, in the case of a current flow direction that corresponds to a current conduction of the body diode of the semiconductor switch. The control unit is designed by way of example so as to activate the disconnecting switch into its disconnected mode in the case of a current flow direction in the reverse direction of the body diode of the semiconductor disconnecting switch in the time region of a zero-crossing point of the phase current. Thus, the disconnection of the power output stage from the stator by means of the semiconductor disconnecting switch in the event of an avalanche breakdown of the semiconductor disconnecting switch cannot lead to the disconnecting switch becoming damaged.

The invention also relates to a steering aid for a motor vehicle, which steering aid comprises an electric motor of the type described above. The steering aid is designed so as to assist the steering of the motor vehicle by means of the electric motor and to this end to generate an additional steering torque.

The invention also relates to a method for operating an electric motor. In the method, a defect of a semiconductor switch of a power output stage of the electric motor, which power output stage is connected to a stator of the electric motor, is detected in dependence upon a braking torque that is acting on a rotor of the electric motor and at least the current path of the defective semiconductor switch to the stator is electrically disconnected in dependence upon the braking torque, so that the defective semiconductor switch can no longer energize the stator.

It is preferred that in dependence upon the braking torque all the semiconductor switches of the power output stage are electrically disconnected from the stator.

It is preferred that a rotor position of the rotor is ascertained in the method and a rotor position signal that represents the rotor position is generated and the stator is energized in dependence upon the rotor position signal and the braking torque is ascertained in dependence upon the rotor position signal. It is further preferred that a rotational speed signal is generated in dependence upon the rotor position signal and the braking torque, in particular a change-over time of the braking torque is ascertained in dependence upon the rotational speed signal.

It is preferred that in the method a zero-crossing point of a current that is flowing through the defective semiconductor switch is ascertained in dependence upon the braking torque, preferably in dependence upon the change of the braking torque, and the semiconductor switch of the power output stage is electrically disconnected from the stator in the time region of the zero-crossing point from the stator.

BRIEF DESCRIPTION OF THE DRAWINGS

The invention is explained hereunder with the aid of figures and further exemplary embodiments.

DETAILED DESCRIPTION

Figure 1:
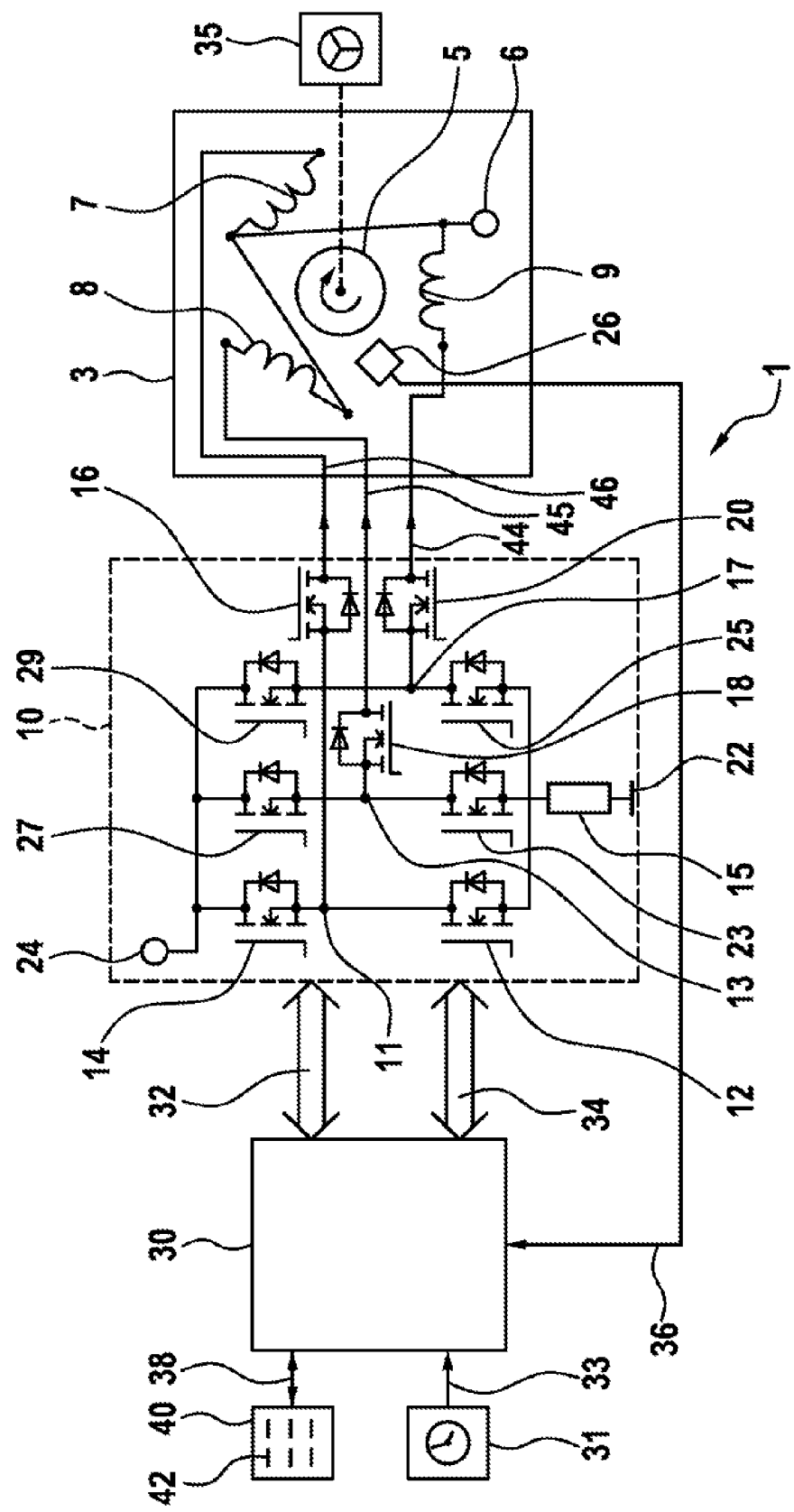
FIG. 1 illustrates schematically an exemplary embodiment for an electric motor having a power output stage and a control unit that is designed so as to detect a defect of a semiconductor switch in dependence upon a rotational speed modulation of a rotor that is caused by a braking torque.

FIG. 1 illustrates schematically an exemplary embodiment for an electric motor 1. The electric motor 1 comprises a stator 3 and a permanent magnet rotor 5. A rotor shaft of the rotor 5 is by way of example—indicated by the broken line—connected to a servo steering system. The stator 3 comprises in this exemplary embodiment three stator coils that are connected in a star connection, namely a stator coil 7, a stator coil 8 and a stator coil 9. The stator coils 7, 8 and 9 are connected in each case by means of a first connector to a common star connector 6.

The electric motor 1 also comprises a power output stage 10. The power output stage 10 is designed so as to energize the stator coils 7, 8 and 9 of the stator 3 in order to generate a rotating magnetic field for the purpose of rotating the rotor in dependence upon control signals that are received on the input side. To this end, the power output stage 10 is connected by way of a multi-channel connection 32 to a control unit 30.

The control unit 30 is by way of example formed by a microprocessor or a microcontroller, an FPGA (FPGA=field programmable gate array) or an ASIC (ASIC=application specific integrated circuit). The power output stage 10 comprises in this exemplary embodiment a B-6 bridge. The B-6 bridge comprises six MOS-FET transistors (MOS-FET=metal oxide semiconductor field effect transistor), of which two mutually series connected transistors 12 and 14 are described by way of example. The transistors of the power output stage 10, in particular of the B-6 bridge, comprise in each case a body diode that is illustrated in this figure. The B-6 bridge is connected by means of a connector 24 to a supply voltage and by way of a shunt resistor 15 to a ground connector 22. The control unit 30 is designed in this exemplary embodiment so as to generate the control signals in order to generate the rotating magnetic field in addition in dependence upon the motor current that is ascertained by means of the shunt resistor.

The transistors of the B-6 bridge comprise in each case a control connector, wherein the control connectors of the transistors are connected by way of the multi-channel connection 32 to the control unit 30.

The power output stage 10 also comprises three disconnecting switches that are embodied in each case as MOS-FET transistors. The stator coil 7 is connected by way of a connecting line 46 and further by way of a controllable disconnecting switch 16 to the transistor pair comprising the transistors 12 and 14 of the B-6 bridge. The transistor 14 forms a high side transistor and the transistor 12 forms a low side transistor. The stator coil 8 is connected by way of a connecting line 45 and further by way of a controllable disconnecting switch 18 to a further output for a further phase of the B-6 bridge. The disconnecting switch 18 is connected to a connection junction 13 that comprises an output of a phase switch comprising two mutually series connected MOS-FET transistors 23 and 27. The stator coil 9 is connected by way of a connecting line 44 and further by way of a controllable disconnecting switch 20 to an output for the stator coil 9 of the B-6 bridge. The disconnecting switch 20 is connected to a connection junction 17 that comprises the output of a phase switch comprising two mutually series connected MOS-FET transistors 25 and 29. The controllable disconnecting switches 16, 18 and 20 are embodied in this exemplary embodiment as MOS-FET transistors. Control connectors of the transistors 16, 18 and 20 are connected by way of the multi-channel connection 34 to the control unit 30.

The electric motor 1 also comprises a rotor position sensor 26 that comprises by way of example at least one Hall sensor. Also feasible is a GMR sensor (GMR=giant magnetoresistive) or an AMR sensor (AMR=anisotropic magnetoresistive). The control unit 30 is connected on the input side by way of a connecting line 36 to the rotor position sensor 26. The rotor position sensor 26 is designed so as to ascertain a rotor position of the rotor 5 and to generate a rotor position signal that represents the rotor position and to transmit said signal to the control unit 30. The control unit 30 is designed so as, in dependence upon the rotor position signal, to generate control signals in order to control the power output stage, in particular the control connectors of the B-6 bridge, in order to generate a rotating magnetic field for the purpose of rotating the rotor 5.

The control unit 30 is designed so as, in dependence upon a signal sample of the rotor position signal, in particular upon at least one frequency component of the rotor position signal, to ascertain a braking torque of the rotor, which braking torque is produced by means of the defective semiconductor switch of the power output stage 10, in particular of the B-6 bridge. The control unit 30 is connected for this purpose by way of a bi-directional connection 38 to a storage device 40 for a look-up table. The storage device 40 stores data records that together form a look-up table. The data record 42 is described by way of example. In this exemplary embodiment, the look-up table in the storage device 40 represents an arrangement between the rotor positions of the rotor 5, which rotor positions are ascertained by means of the rotor position sensor 26, and semiconductor switches of the B-6 bridge of the power output stage 10. The control unit 30 is further designed so as to read out from the storage device 40 by way of the connection 38 data records that represent the look-up table and to compare the data records that represent a predetermined rotor position with the rotor position signal. The control unit 30 is further designed so as to ascertain one semiconductor switch in dependence upon the rotor position signal and further to ascertain in dependence upon a comparison result of a comparison using the look-up table at least one defective semiconductor switch of the power output stage. The control unit 30 is further designed so as, in dependence upon the ascertained defective semiconductor switch, to control at least one disconnecting switch or to control all the disconnecting switches 16, 18 and 20 by way of the multichannel connection 34 and thus to disconnect the stator 3 from the power output stage 10.

In this exemplary embodiment, the control unit 30 is designed so as to activate into its disconnected mode at least one disconnecting switch in dependence upon the rotor position signal and consequently in dependence upon the rotor position in the time region of the zero-crossing point of a current that is generated by a stator coil during the generator mode and that flows through the defective semiconductor switch. To this end, the control unit 30 is designed so as to generate a rotational speed signal from the rotor position signal in dependence upon a time signal, which rotational speed signal represents a rotational speed of the rotor and to ascertain a frequency modulation of a rotational speed signal. To this end, the control unit 30 is connected by way of a connecting line 33 to a clock pulse generator 31 that is designed so as to generate a time signal as a time base for ascertaining the rotational speed signal. The clock pulse generator is by way of example formed by an oscillating crystal.

If by way of example, the high side transistor 14 is defective and consequently is conductive with a low resistance, then an error current flows from the supply voltage connector 24 by way of the drain connector of the transistor 14, its switching path and by way of the source connector of the transistor 14, further by way of a connection junction 11 that forms an output of the phase switch of the stator coil 7 and further by way of the disconnecting switch 16 and by way of the connecting line 46 to the second connector of the stator coil 7. The source connector of the semiconductor disconnecting switch 16 is connected in this exemplary embodiment to the connection junction 11, the drain connector is connected to the connecting line 46. As a result, if the disconnecting switch is open, the error current flows in the direction of the body diode of the disconnecting switch 16 that is embodied in this exemplary embodiment as a MOS-FET transistor. The error current flows by way of the star connector 6 and by way of the stator coils 9 and 8 back by way of the connecting lines 45 and 44 and consequently also by way of the disconnecting switches 20 and 18 by way of the high side transistor 27 and/or the high side transistor 29 of the B-6 bridge where it flows in the through-flow direction of the respective body diode back to the defective semiconductor switch 14.

The control unit 30 is designed so as, in dependence upon a defect of the semiconductor switch 14 that has been ascertained in dependence upon the rotor position signal, to transmit a control signal to the disconnecting switch 16 in order to disconnect the stator coil 7 that is connected to the semiconductor switch 14. The control unit is by way of example designed so as, in the event of a defective transistor, to activate the disconnecting switch of the power output stage 10 at a rotor position of the rotor 5 in accordance with the following table:

| Error on | Phase 1 Coil 7 | Phase 2 Coil 8 | Phase 3 Coil 9 |
| --- | --- | --- | --- |
| High side | 180°-240° | 300°-360° | 60°-120° |
| Low side | 0°-60° | 120°-180° | 240°-300° |

Since the error current as explained in the preceding example of the defective high side transistor 14 flows in the disconnected state in the direction of the body diode of the disconnecting switch 16, the disconnecting switch 16 can be disconnected during a point in time of a period of the error current flow in accordance with the above table. Advantageously, a disconnection can be performed by means of the control unit 30 at a zero-crossing point of the error current, so that the error current that is flowing through the disconnecting switches 18 and 20 in the reverse direction of the respective body diode cannot damage said disconnecting switch during a landslide breakdown, also referred to as an avalanche breakdown.

In the case of a defective low side transistor, by way of example the semiconductor switch 12, the error current that is induced in the stator coil 7 flows from the stator coil 7 by way of the connecting line 46 in the reverse direction of the body diode of the disconnecting switch 16 through the disconnecting switch 16, further by way of the connection junction 11 to the drain connector of the semiconductor switch 12, through the defective semiconductor switch 12 to the source connector of the semiconductor switch 12 and further by way of the further low side transistors 23 and 25 of the B-6 bridge back to the star connector 6 that is connected to the first connector of the stator coil 7. The error current flows from the source connector of the semiconductor switch 12 by way of a low side transistor 13 of the low side transistors 23 and 25 of the B-6 bridge to a connection junction 13 that is connected to a source connector of the disconnecting switch 18, by way of the disconnecting switch 18 and further by way of the connecting line 45 by way of the stator coil 8 back to the star connector 6. The error current flows parallel thereto from the source connector of the semiconductor switch 12 by way of a low side semiconductor switch 25 of the previously mentioned further semiconductor switches and by way of a connection junction 17, further by way of the disconnecting switch 20 and by way of the connecting line 44 by way of the stator coil 9 to the star connector 6. The error currents in the disconnecting switches 18 and 20 flow in the direction of the body diode of the disconnecting switches 18 and 20, the error current through the disconnecting switch 16 flows in the reverse direction of the body diode of the disconnecting switch 16 in the case of the disconnection of the disconnecting switch 16, get into the avalanche breakdown and are damaged.

The switching path of the disconnecting switch 16 would then be connected in a low resistance manner, so that the disconnecting switch 16 can no longer disconnect the stator coil 7 from the power output stage 10. The control unit 30 is designed in this exemplary embodiment so as, in the event of the defective low side transistor 12, to activate the disconnecting switch 16 into its disconnected mode in the region of a zero-crossing point of the error current that is flowing through the disconnecting switch 16.

Figure 2:
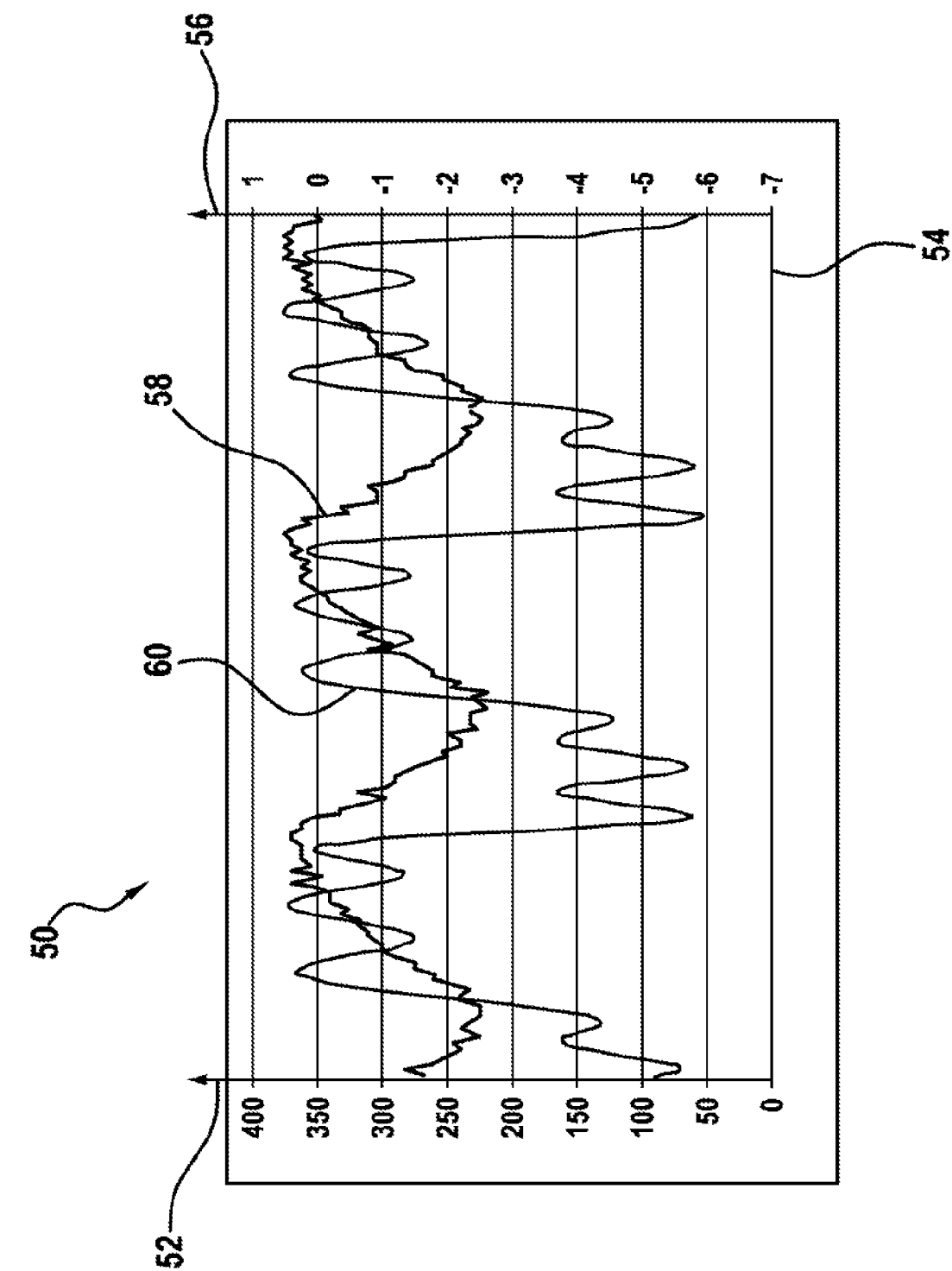
FIG. 2 illustrates a diagram having a speed-indicator signal that is modulated by means of a defective semiconductor switch and that represents a rotational speed of the rotor that is illustrated in FIG. 1.

FIG. 2 illustrates a diagram 50. The diagram 50 has an X-coordinate 54 and a Y-coordinate 52. The X-coordinate 54 represents a time progression, the Y-coordinate 52 represents a rotational speed of the rotor of the electric motor 1 in revolutions per minute, which rotor is illustrated in FIG. 1. A graph 58 is also illustrated that represents rotor position signals that are captured by the rotor position sensor 26. A graph 60 is also illustrated that represents a braking torque that can be generated at a rotor shaft of the rotor 5 shown in FIG. 1. A further Y-coordinate 56 represents a magnitude of the braking torque of the graph 60. The graphs 58 and 60 are based in each case on a measurement and therefore in addition to the represented large signals the graphs 58 and 60 represent further signal portions that influence the shape of the graphs 58 and 60. The control unit illustrated in the FIG. 1 is designed so as—by way of example by means of a signal analyzer—to ascertain the braking torque that is generated by the electric motor 1 and is represented by means of the graph 60 in dependence upon a rotational speed signal, in particular a frequency modulation of the rotational speed signal that is represented by the curve 58. The control unit 30 in FIG. 1 is designed by way of example so as, in dependence upon the rotor position signal, to generate the rotational speed signal that represents the rotational speed of the rotor 5. The graphs 58 and 60 in the diagram 50 illustrate that during a drop in the rotor rotational speed a torque at the rotor shaft reduces and consequently a braking torque at the rotor shaft increases.

The invention claimed is:

1. An electronically commutated electric motor (1), having a stator (3) and a rotor (5),
   wherein the electric motor (1) comprises a control unit (30) that is connected on the output side to the stator (3) and is designed so as to energize the stator in order to generate a rotating magnetic field,
   characterized in that
   the electric motor (1) comprises a power output stage (10) having semiconductor switches (12, 14, 23, 25, 27, 29), which power output stage is connected to the stator (3) by way of at least one controllable disconnecting switch (16, 18, 20), and the control unit (30) is designed so as to detect a defect of a semiconductor switch (12, 14, 23, 25, 27, 29) in dependence upon a braking torque that is caused at the rotor (5) as a result of the defect and to activate the disconnecting switch (16, 18, 20) in the current path of the defective semiconductor switch (12, 14, 23, 25, 27, 29) in order to disconnect the semiconductor switch (12, 14, 23, 25, 27, 29) from the stator (3).

2. The electric motor (1) as claimed in claim 1, characterized in that
   the electric motor (1) comprises a rotor position sensor (26) that is connected to the control unit (30) and is designed so as to ascertain a rotor position of the rotor (5) and to generate a rotor position signal that represents the rotor position, and the control unit (30) is designed so as to ascertain the braking torque.

3. The electric motor (1) as claimed in claim 1, characterized in that
   the control unit (30) is connected to the disconnecting switch (16, 18, 20) and is designed so as, in dependence upon a voltage drop that occurs across the disconnecting switch, to ascertain a zero-crossing point of a current that is flowing through the defective semiconductor switch (12, 14, 23, 25, 27, 29) and to activate the disconnecting switch (16, 18, 20) into its disconnected mode in the time region of the zero-crossing point.

4. The electric motor (1) as claimed in claim 1, characterized in that
   the control unit (30) is designed so as, in dependence upon the rotor position signal, to ascertain a zero-crossing point of a current that is flowing through the defective semiconductor switch and to activate the disconnecting switch into its disconnected mode in the time region of the zero-crossing point.

5. The electric motor (1) as claimed in claim 1, characterized in that
   the disconnecting switch (16, 18, 20) is a semiconductor switch, and the control unit (30) is designed so as, in dependence upon a current flow direction of a current that is flowing through the disconnecting switch (16, 18, 20), to activate the disconnecting switch (16, 18, 20) into its disconnected mode.

6. A steering aid (1, 35) for a motor vehicle having an electric motor (1) as claimed in claim 1.

7. The electric motor (1) as claimed in claim 1, wherein the rotor (5) is a permanent magnet rotor.

8. The electric motor (1) as claimed in claim 1, wherein the control unit (30) ascertains the braking torque using a change over time of the braking torque in dependent upon the rotor position signal.

9. The electric motor (1) as claimed in claim 1, wherein the disconnecting switch (16, 18, 20) is a field effect transistor.

10. A method for operating an electric motor (1),
    in which method a defect of a semiconductor switch (12, 14, 23, 25, 27, 29) of a power output stage (10) of the electric motor (1), which power output stage is connected to a stator (3) of the electric motor (1), is ascertained in dependence upon a change-over time of a braking torque (60) that is acting on a rotor (5) of the electric motor (1), and at least the current path of the defective semiconductor switch to the stator is electrically disconnected in dependence upon the braking torque, so that the defective semiconductor switch can no longer energize the stator.

11. The method as claimed in claim 10,
    in which, in dependence upon the braking torque, all the semiconductor switches of the power output stage are electrically disconnected from the stator.

12. The method as claimed in claim 10,
    in which a rotor position of the rotor (5) is ascertained and a rotor position signal that represents the rotor position is generated and the stator (3) is energized in dependence upon the rotor position signal and a change-over time of the braking torque is ascertained in dependence upon the rotor position signal.

13. The method as claimed in claim 10,
    in which a zero-crossing point of a current that is flowing through the defective semiconductor switch is ascertained in dependence upon a change-over time of the braking torque and the semiconductor switch (12, 14, 23, 25, 27, 29) of the power output stage (10) is electrically disconnected from the stator (3) in the time region of the zero-crossing point from the stator (3).

* * * * *